United States Patent
Yamauchi (10) Patent No.: US 11,868,069 B2
(45) Date of Patent: Jan. 9, 2024

(54) IMAGE FORMING SYSTEM AND STORAGE MEDIUM

(71) Applicant: KONICA MINOLTA, INC., Tokyo (JP)

(72) Inventor: Yuki Yamauchi, Tokyo (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 17/961,536

(22) Filed: Oct. 6, 2022

(65) Prior Publication Data
US 2023/0116925 A1    Apr. 20, 2023

(30) Foreign Application Priority Data
Oct. 19, 2021    (JP) .................... 2021-170588

(51) Int. Cl.
*G03G 15/20*    (2006.01)
*G03G 15/00*    (2006.01)

(52) U.S. Cl.
CPC ....... *G03G 15/206* (2013.01); *G03G 15/5029* (2013.01)

(58) Field of Classification Search
CPC ............. G03G 15/206; G03G 15/5029; G03G 15/6582; G03G 15/6585; G03G 2215/0081; G03G 2215/00805
See application file for complete search history.

(56) References Cited

U.S. PATENT DOCUMENTS

| 5,160,399 | A | * | 11/1992 | Ueda | .................... B32B 38/0036 34/535 |
| 6,663,238 | B2 | * | 12/2003 | Kikuchi | ............... B41J 11/0015 156/308.2 |
| 2005/0081978 | A1 | * | 4/2005 | Britz | .................... B32B 38/004 156/64 |

FOREIGN PATENT DOCUMENTS

JP    2008044129 A    2/2008

* cited by examiner

*Primary Examiner* — Hoang X Ngo
(74) *Attorney, Agent, or Firm* — SQUIRE PATTON BOGGS (US) LLP (57) ABSTRACT

An image forming system includes the following. An image former forms an image on a recording medium. A laminator performs lamination in which a film is laminated on a surface of the recording medium on which the image is formed by the image former. A hardware processor obtains information regarding image forming by the image former and that determines a condition of the lamination by the laminator based on the obtained information regarding the image forming.

20 Claims, 5 Drawing Sheets

| FILM THICKNESS | | SHEET BASIS WEIGHT [g/m²] | | | |
|---|---|---|---|---|---|
| | | 00-150 | 151-200 | 201-300 | 301- |
| 20-30 μm | PROCESSING TEMPERATURE | 180°C | 180°C | 190°C | 200°C |
| | PROCESSING PRESSURE | 1800N | 2000N | 2500N | 2500N |
| 31-50 μm | PROCESSING TEMPERATURE | 180°C | 190°C | 200°C | 200°C |
| | PROCESSING PRESSURE | 1800N | 2000N | 2500N | 2500N |
| 51-70 μm | PROCESSING TEMPERATURE | 180°C | 190°C | 200°C | 210°C |
| | PROCESSING PRESSURE | 2000N | 2200N | 2500N | 2500N |
| 71-100 μm | PROCESSING TEMPERATURE | 190°C | 200°C | 210°C | 220°C |
| | PROCESSING PRESSURE | 2000N | 2200N | 2500N | 2500N |

FIG.6

| SHEET TYPE | CORRECTION VALUE |
|---|---|
| NORMAL SHEET | NO CORRECTION |
| HIGH QUALITY SHEET | NO CORRECTION |
| COATED SHEET | -5°C |

FIG.7

| PRINT RATE | CORRECTION VALUE |
|---|---|
| 0~20% | NO CORRECTION |
| 21~40% | +5°C |
| 41~60% | +10°C |
| 61~80% | +10°C |
| 81~100% | +15°C |

IMAGE FORMING SYSTEM AND STORAGE MEDIUM

CROSS-REFERENCE TO RELATED APPLICATIONS

The entire disclosure of Japanese Patent Application No. 2021-170588 filed on Oct. 19, 2021 is incorporated herein by reference in its entirety.

BACKGROUND

Technological Field

The present invention relates to an image forming system and a storage medium.

Description of the Related Art

Conventionally, there is a well-known printing processing apparatus in which all steps from printing to lamination in a process to cover a transparent resin film on a printed material is performed (JP 2008-44129).

In such printing processing apparatus, by performing all steps from printing to lamination, the manpower required for each step can be reduced, and all steps from printing to lamination can be completed by automated operation.

SUMMARY

However, according to JP 2008-44129, the conditions of the lamination are determined by the user, and the conditions of the lamination needed to be set each time printing conditions changed.

Moreover, when the user performs lamination with printed material and film that are handled for the first time, the lamination conditions are determined by first actually testing the lamination conditions and then modifying the lamination conditions if necessary. Therefore, there is a problem that it takes time to determine the conditions of the lamination.

For example, when material printed by electrophotographic printing using toner is laminated, problems such as peeling and curling of the film after the lamination frequently occurred. Therefore, there is a problem that it is difficult for the user to find the conditions of the lamination easily.

Further, in a system integrating a printing apparatus that thermally fixes toner and a means for the lamination, conditions of a temperature of the paper ejected from the printing apparatus change each time a job is performed, and it is necessary to adjust the conditions of the lamination each time.

The purpose of the present invention is to provide an image forming system and a program included in a storage medium so that conditions for the lamination can be easily set.

To achieve at least one of the abovementioned objects, according to an aspect of the present invention, an image forming system reflecting one aspect of the present invention includes, an image former that forms an image on a recording medium; a laminator that performs lamination in which a film is laminated on a surface of the recording medium on which the image is formed by the image former; and a hardware processor that obtains information regarding image forming by the image former and that determines a condition of the lamination by the laminator based on the obtained information regarding the image forming.

According to another aspect, a non-transitory computer-readable storage medium storing a program causing a computer in an image forming system to perform: laminating in which a film is laminated on a surface of a recording medium on which an image is formed; first obtaining in which information regarding image forming is obtained; and determining a condition of the lamination performed in the laminating based on the information regarding the image forming obtained in the first obtaining.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION OF THE EMBODIMENTS

Hereinafter, embodiments of the present invention are described in detail with reference to the drawings. However, the scope of the invention is not limited to the disclosed embodiments.

<Configuration of Image Forming System>

Figure 1:
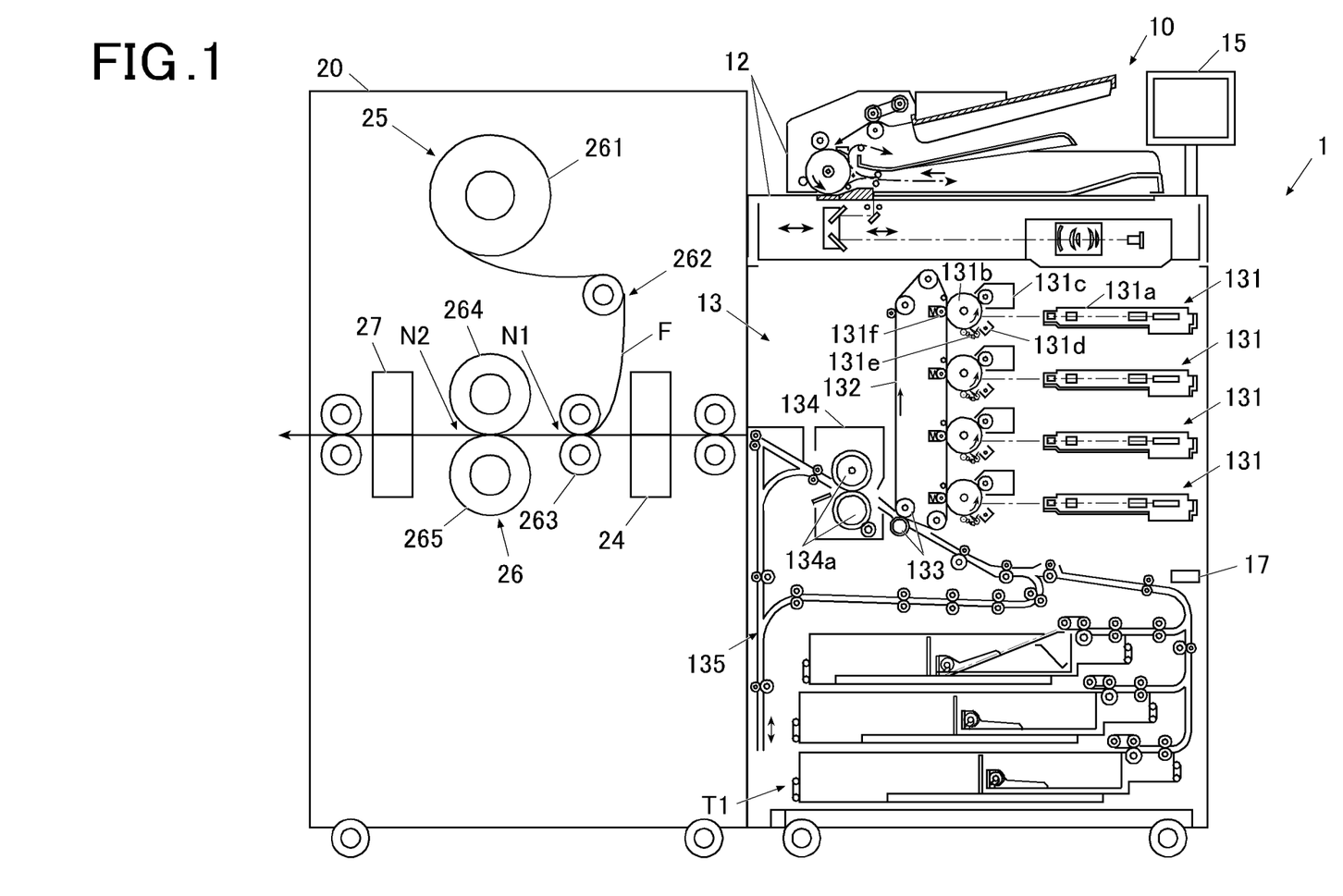
FIG. 1 is a front view showing a schematic configuration of an image forming system according to the present embodiment.
Figure 2:
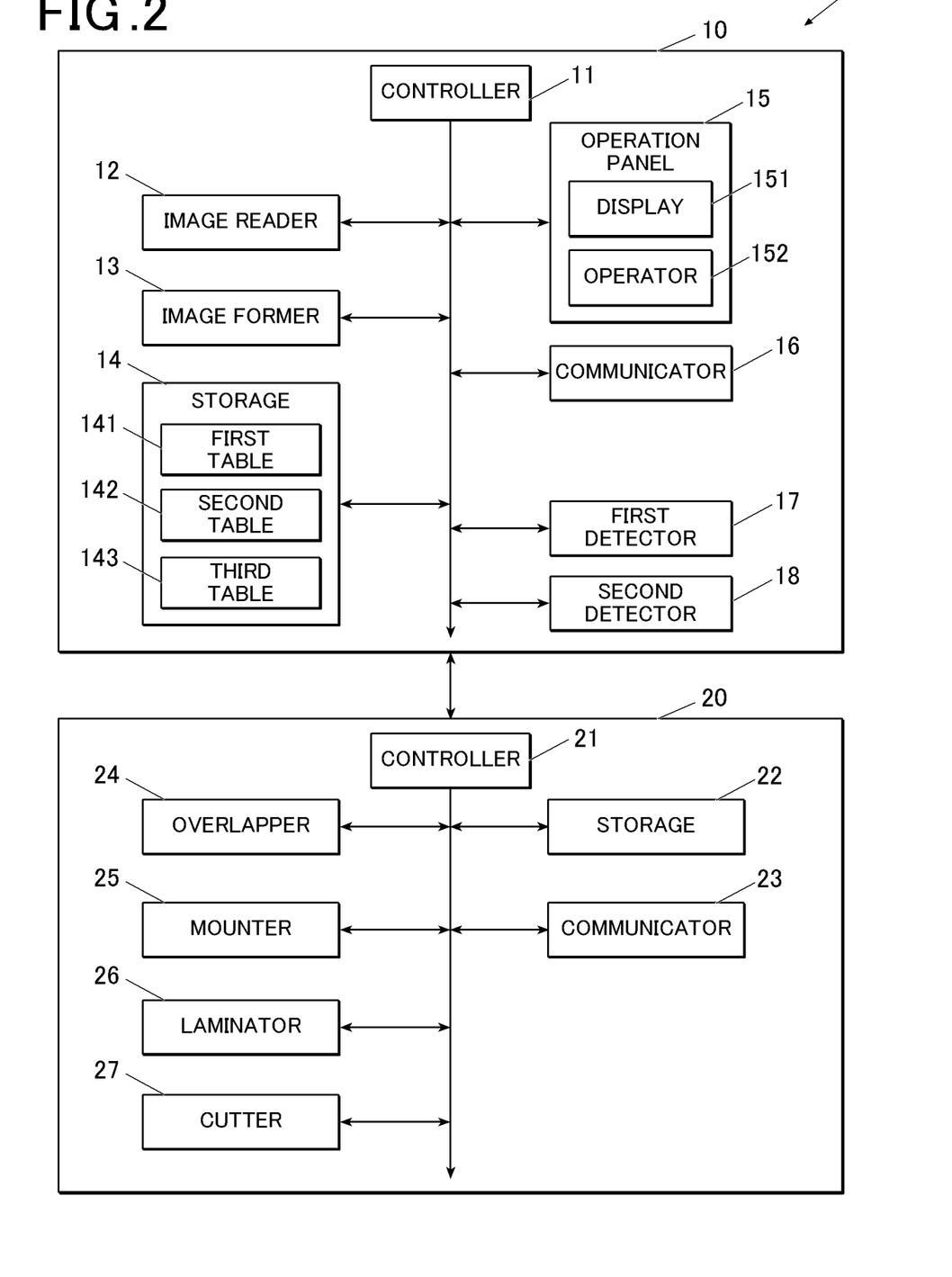
FIG. 2 is a functional block diagram showing a control configuration of the image forming system according to the present embodiment.

As shown in FIG. 1 and FIG. 2, an image forming system 1 according to the embodiment includes an image forming apparatus 10 and a post processing apparatus 20 in which lamination is performed on a recording medium in which an image is formed by the image forming apparatus 10.

As shown in FIG. 1 and FIG. 2, the image forming apparatus 10 includes a controller 11 (hardware processor), an image reader 12, an image former 13, a storage 14, an operation panel 15 (display 151, operator 152), a communicator 16, a first detector 17, and a second detector 18.

The controller 11 includes a central processing unit (CPU), a random access memory (RAM), a read only memory (ROM), and the like. In accordance with the operation signal input from the operator 152 or the instruction signal received by the communicator 16, the CPU reads out various processing programs stored in the ROM, and deploys them in the RAM. With this, the CPU integrally controls the operation of the image forming apparatus 10 in coordination with the various programs deployed in the RAM.

The controller 11 obtains information regarding the image forming by the image former 13, and determines the conditions for the lamination by a later-described laminator 26 based on the obtained information regarding the image forming.

The controller 11 selects one film F (later-described) from any of the plurality of films F mounted to a later-described mounter 25. Here, the controller 11 functions as a selector.

The image reader 12 performs scanning and exposure to the image of the document placed on a document table or ADF (Auto Document Feeder) not shown in the drawings by the optical system of the scanning exposure device, reads the reflected light with a line image sensor, and thus obtains the image signal. After processing such as A/D conversion, shading correction and compression is performed to the image signal, the processed image signal is input as image data to the controller 11. The image data input to the controller 11 is not limited to the data read by the image reader 12, and for example, may be included in a print job received from an external device (not shown) via the communicator 16.

The image former 13 forms an image formed of four colors of C, M, Y and K on a sheet according to pixel values of four colors of respective pixels of the original image to which image processing is performed.

As shown in FIG. 1, the image former 13 includes four writers 131, an intermediate transfer belt 132, secondary transfer rollers 133, a fixer 134 and the like.

The four writers 131 are arranged in series (tandem) along the belt surface of the intermediate transfer belt 132, and form images of respective colors of C, M, Y and K. Each writer 131 has the same configuration with the exception that the color of the formed image is different. Each writer 131 includes, an optical scanner 131a, a photoreceptor 131b, a developer 131c, a charger 131d, a cleaner 131e, and a primary transfer roller 131f.

When the image is formed in each writer 131, after the photoreceptor 131b is charged by the charger 131d, the photoreceptor 131b is scanned with light beams emitted by the optical scanner 131a based on the original image, and an electrostatic latent image is formed. When developing is performed by supplying color materials such as toners with the developer 131c, an image is formed on the photoreceptor 131b.

The images formed on the respective photoreceptors 131b of the four writers 131 are transferred (primarily transferred) in order to be laid on each other on the intermediate transfer belt 132 by the respective primary transfer rollers 131f. With this, the images of respective colors are formed on the intermediate transfer belt 132. The intermediate transfer belt 132 is an image carrier which rotates by being wounded around a plurality of rollers and rotated. After primary transfer, the color materials remaining on the photoreceptors 131b are removed by the respective cleaners 131e.

The image former 13 feeds a sheet which is a recording medium from a sheet feeding tray T1 at the timing when the image on the rotating intermediate transfer belt 132 reaches the position of the secondary transfer roller 133. According to the present embodiment, the paper is sheet paper. In the secondary transfer roller 133, one of a pair of rollers presses against the intermediate transfer belt 132, and the other is one of the plurality of rollers rotating the intermediate transfer belt 132. When the image is transferred (secondarily transferred) onto the sheet from the intermediate transfer belt 132 by pressing of the secondary transfer roller 133, the sheet is conveyed to the fixer 134 to perform fixing processing, and conveyed to the postprocessing apparatus 20. The fixing process is a process to fix the image onto the sheet by heating and pressurizing the sheet with fixing rollers 134a. In a case where the image is formed on both sides of the sheet, after the sheet is conveyed to a reversing path 135 and the surface of the sheet is reversed, the sheet is fed to the position of the secondary transfer roller 133 again.

The storage 14 is a nonvolatile storage formed of an HDD (Hard Disk Drive), an SSD (Solid State Drive) or the like, and stores various types of programs, various types of setting data and the like so as to be readable and writable from the controller 11.

The storage 14 stores information regarding the image forming such as type of sheet (sheet type), thickness (sheet thickness), and surface roughness, and information regarding fixing temperature in the fixer 134 (information regarding fixing temperature conditions). The information regarding the fixing temperature of the fixer 134 is used in a later-described processing condition determination process as information regarding sheet temperature conditions discharged from the image forming apparatus 10.

The storage 14 stores a sheet conveying speed as a processing speed to form an image on the sheet in the image former 13 and to fix the image.

The storage 14 stores a first table 141, a second table 142, and a third table 143.

Figure 5:
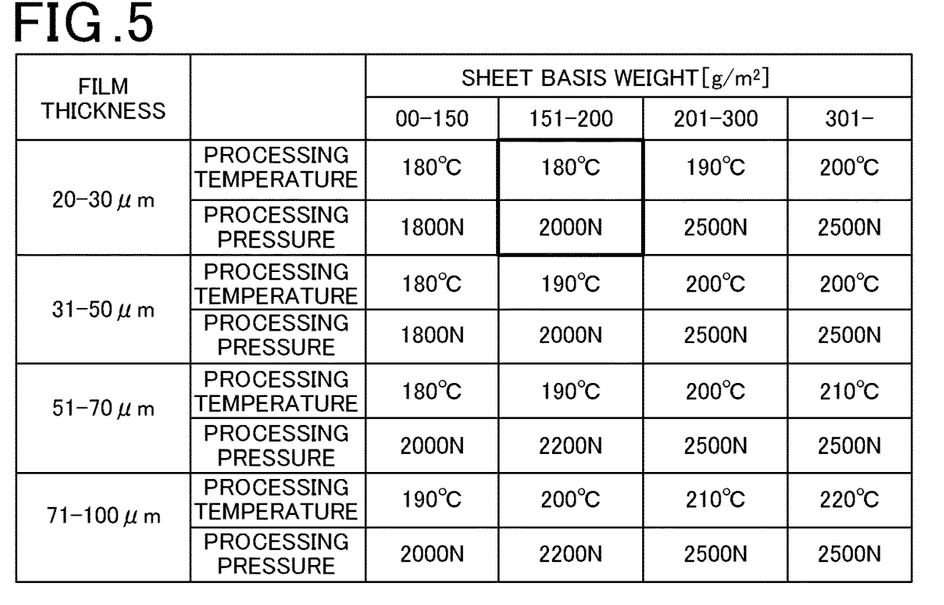
FIG. 5 is a diagram showing an example of a first table.

The first table 141 is a correspondence table showing processing temperature and a processing pressure in lamination based on film thickness of the film F and basis weight (sheet thickness) of the sheet. The processing temperature is temperature at a nip N2 heated by a later-described heating roller 264. The processing pressure is pressure on a nip N2 formed by the heating roller 264 and a pressuring roller 265.

Figure 6:
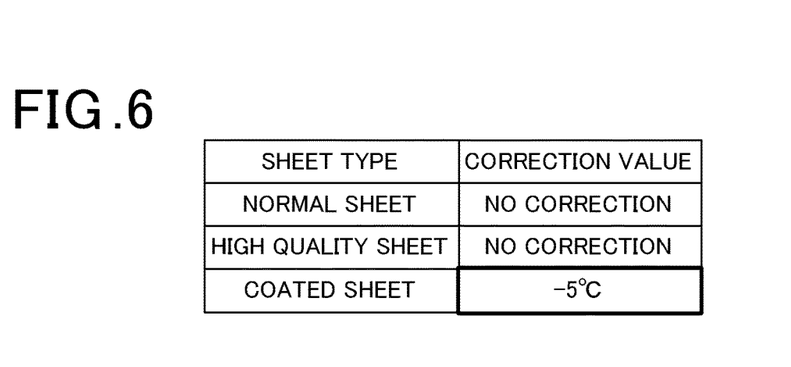
FIG. 6 is a diagram showing an example of a second table.

The second table 142 is a correspondence table showing a value to correct the processing temperature in the lamination based on sheet type of the sheet.

Figure 7:
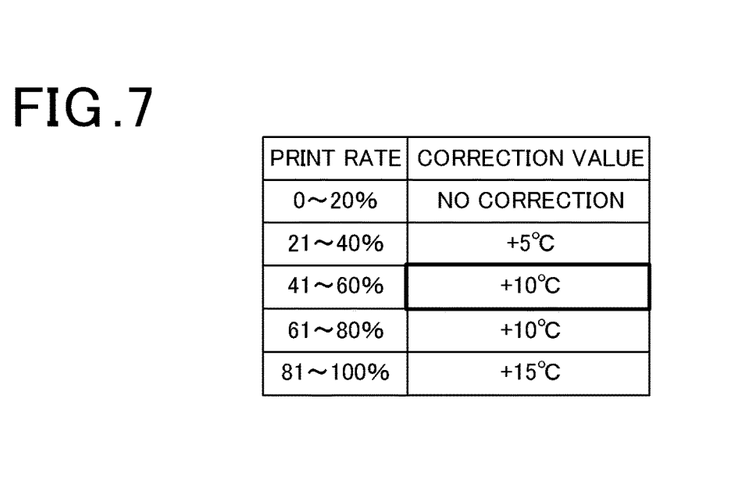
FIG. 7 is a diagram showing an example of a third table.

The third table 143 is a correspondence table showing a value to correct the processing temperature based on a print rate which is a percentage that the toner is placed on the sheet in which the image is formed.

The storage 14 stores the range of processing conditions in which lamination can be performed for each film type.

The storage 14 stores the film selection setting information. The film selection setting information is information setting a selection standard for selecting which film roll 261 when the mounter 25 includes a plurality of different types of film rolls 261. Specifically, the standard may be, to select the film roll 261 with the film F that has higher stability in the lamination, to select the film roll 261 with the film F that is cheaper, or to select the film roll 261 with the film F that has higher transparency.

The film selection setting information may include a print job received from an external device or may be input by the user through the operator 15.

The operation panel 15 includes a display 151 which displays various types of information to the user and an operator 152 which receives the operation input by the user.

The display 151 is configured by including a color liquid crystal display or the like, and displays an operation screen or the like (various types of setting screens, various types of buttons, operation status of each function and the like) in accordance with the display control signal input from the controller 11.

The operator 152 includes a touch panel which is provided on the screen of the display 151, and various hard keys which are arranged around the screen of the display 151. When a button displayed on the screen is pressed by a finger, a touch pen or the like, the operator 152 finds the X and Y coordinates of the pressed point by the voltage value, and outputs the operation signal corresponding to the found position to the controller 11. The touch panel is not limited to a pressure sensitive type, and may be a static type or an optical type, for example. When a hard key is pressed, the operator 152 outputs the operation signal corresponding to the pressed key to the controller 11. The user can perform setting regarding image forming such as image quality setting, magnification setting, application setting, output setting and paper setting, sheet conveyance instruction and stop operation of the apparatus by operating the operator 152.

The communicator 16 is an interface which connects the image forming apparatus 10 with the communication network. The communicator 16 includes a communication IC (Integrated Circuit), a communication connector and the like, and performs transmitting and receiving of various types of information with external devices which are connected to the communication network by using a predetermined communication protocol under the control by the controller 11. The communicator 16 is able to input and output various information through a USB (Universal Serial Bus).

The first detector 17 detects the type of sheet (sheet type), thickness (sheet thickness), and surface roughness on a sheet conveying path in a position upstream than the image former 13. The first detector 17 outputs the detection results to the controller 11. The controller 11 stores the received detected result in the storage 14.

The second detector 18 detects the temperature and the humidity in the image forming system 1 and around the image forming system 1, and outputs the detected result to the controller 11.

The post processing apparatus 20 includes a controller 21, a storage 22, a communicator 23, an overlapper 24, a mounter 25, a laminator 26, and a cutter 27.

The controller 21 includes a CPU, a RAM, a ROM, and the like. In accordance with the instruction signal received by the communicator 23, the CPU reads out various processing programs stored in the ROM, and deploys them in the RAM. With this, the CPU integrally controls the operation of the post-processing apparatus 20 in coordination with the various programs deployed in the RAM.

The storage 22 is a nonvolatile storage formed of an HDD, an SSD or the like, and stores various types of programs, various types of setting data and the like so as to be readable and writable from the controller 22.

The storage 22 stores information regarding the type of film F which is the information regarding the lamination (film type information). The film type information is, for example, film thickness.

The communicator 23 is an interface which connects the post-processing apparatus 20 with the communication network. The communicator 23 includes a communication IC, a communication connector and the like, and performs transmitting and receiving of various types of information with external devices which are connected to the communication network by using a predetermined communication protocol under the control by the controller 21. The communicator 23 can input and output various types of information via the USB.

As shown in FIG. 1, the overlapper 24 is provided on the upstream side of the sheet feeding path than the laminator 26.

The overlapper 24 overlaps a rear end of the preceding sheet on an upper portion of a front end of the following sheet in a predetermined overlapped amount, and the sheet is conveyed in a continuous band shape.

The mounter 25 is configured to be able to mount the film roll 261 with different types of films F, and is configured so that the user is able to select any one of the film roll 261 that is mounted.

Any one type of film roll 261 may be mounted on the mounter 25, or two or more types of film rolls 261 may be mounted on the mounter 25 at the same time.

The laminator 26 performs the lamination to attach the film F continuously on a surface (front surface) side on which the image is formed by the image forming apparatus 10 on sheets overlapped by the overlapper 24.

The laminator 26 includes the film roll 261, the film conveying path 262, a bonder 263, the heating roller 264, and the pressuring roller 265.

The film roll 261 is a roll of two layers of the film F.

The film F includes a transparent resin film layer and an adhesive layer.

The film conveying path 262 is the path used to convey the film F from the film roll 261 to the nip N1 of the bonder 263.

When two or more types of film rolls 261 are mounted on the mounter 25 at the same time, the film F of the selected film roll 261 is able to move on the film conveying path 262 so as to be conveyed to the nip N1 of the bonder 263.

As shown in FIG. 1, the bonder 263 includes two rollers, and the sheet and the film F are sandwiched at the nip N1 formed by the two rollers. Then, the adhesive layer of the film F adheres to the surface of the sheet.

With this, the sheet is bonded to the film F.

The heating roller 264 includes a heating means such as a halogen heater.

The pressuring roller 265 is urged upward by a force applying material (not shown) such as a spring and is pressed against the heating roller 264. With this, a nip N2 is formed with the surfaces of the heating roller 264 and the pressuring roller 265 coming into contact.

The adhesive layer of the film F is melted by the heating roller 264 and the pressuring roller 265 at the nip N2. The melted adhesive layer adheres to the surface of the sheet and is then thermo-compressed and attached.

The controller 21 controls the temperature of the heating roller 264, the pressure of the pressuring roller 265, and the processing speed in the lamination by the heating roller 264 and the pressuring roller 265.

The cutter 27 inserts a cutting blade between sheets overlapped by the overlapper 24 and cuts only the film F. With this, the sheets are separated.

<2. Operation of Image Forming System>

Figure 3:
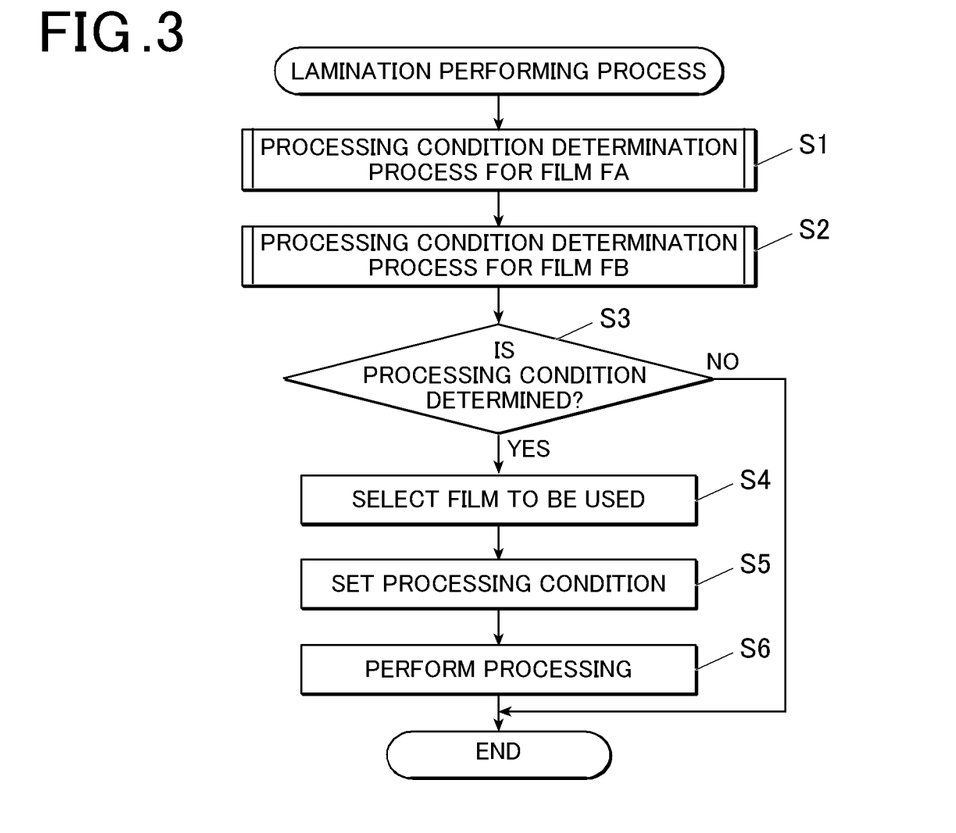
FIG. 3 is a flowchart showing a flow of a lamination performing process.

Next, the operation of the image forming system 1 according to the present embodiment is described. FIG. 3 is a flowchart showing a procedure of the lamination performing process performed by the image forming system 1. The post-processing apparatus 20 according to the present embodiment includes two types of films F, film FA and film FB.

In the lamination performing process, first, when the print job including the lamination is received, the controller 11 of the image forming apparatus 10 performs the processing condition determination process for the film FA (step S1).

The controller 11 performs the processing condition determination process and determines the processing condition of the lamination. The processing conditions are the processing temperature, the processing pressure and the processing speed at the nip N2 formed by the heating roller 264 and the pressuring roller 265.

Figure 4:
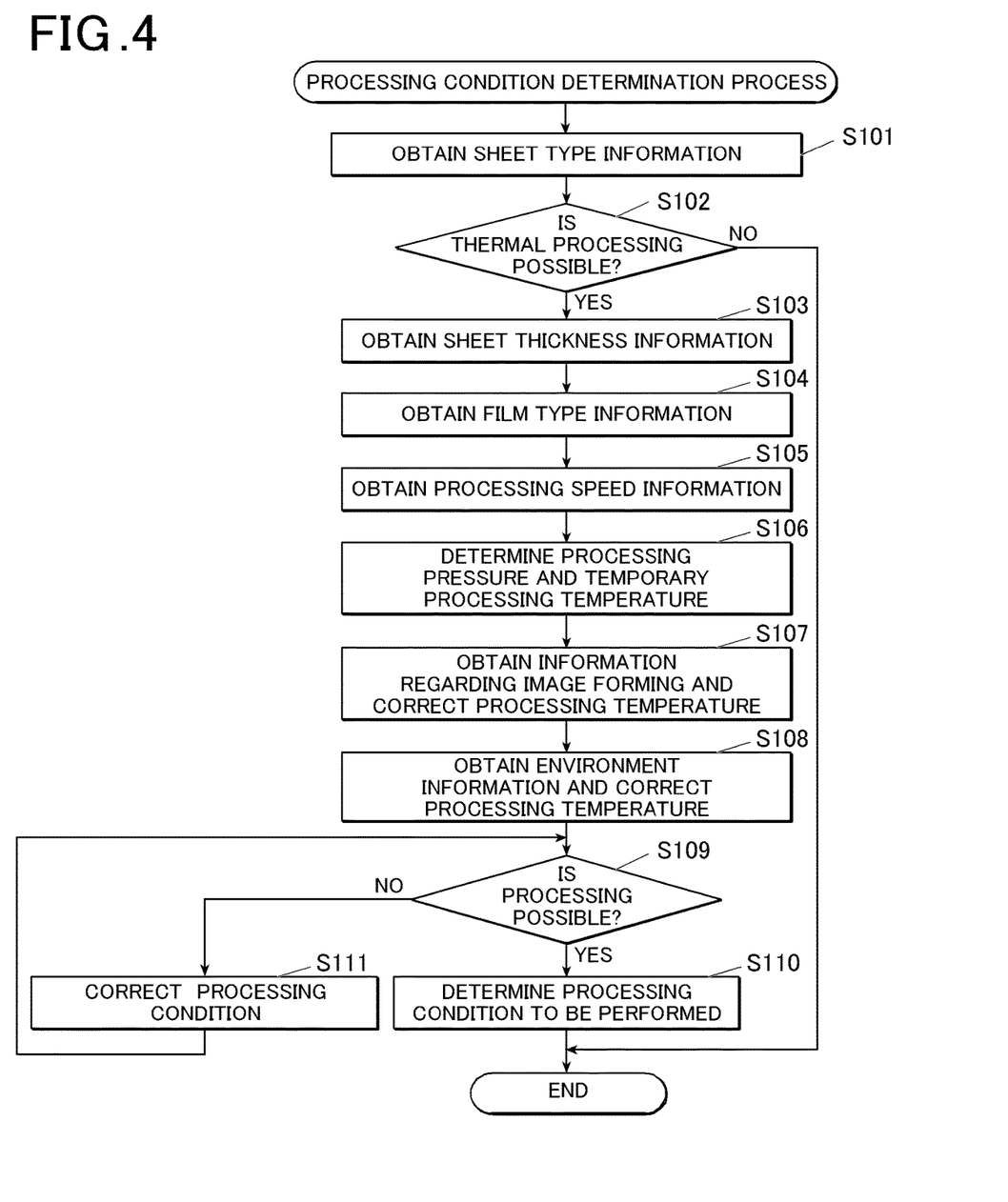
FIG. 4 is a flowchart showing a flow of a processing condition determination process.

FIG. 4 is a flowchart showing a procedure of the processing condition determination process.

In the processing condition determination process, the controller 11 obtains the sheet type information of the sheet from the storage 14 (step S101).

Next, the controller 11 determines whether the sheet is a type that can be thermally processed based on the sheet type information obtained in step S101 (step S102).

When the sheet is the sheet type that cannot be thermally processed (step S102; NO), the controller 11 ends the present process.

When the sheet is a sheet type that can be thermally processed (step S102; YES), the controller 11 obtains the sheet thickness information of the sheet from the storage 14 (step S103).

The step S103 is a first obtaining step to obtain information regarding image forming.

Next, the controller 11 obtains the film type information regarding the film FA from the storage 22 of the post-processing apparatus 20 through the communicator 16 (step S104).

Next, the controller 11 obtains the sheet conveying speed from the storage 14 as processing speed information which is information regarding the laminating process (step S105).

The steps S104 and S105 are second obtaining steps to obtain information regarding the lamination.

Next, the controller 11 determines the processing pressure and the temporary processing temperature for the lamination performed by the laminator 26 based on the sheet thickness information of the sheet obtained in step S103, the film type information obtained in step S104, and the processing speed information obtained in step S105 (step S106).

FIG. 5 shows an example of the first table. The example shown in FIG. 5 is a correspondence table showing the processing pressure and the processing temperature based on the film thickness of the film F and the basis weight (sheet thickness of the sheet) when the processing speed is 300 mm/s. According to the present embodiment, for example, the film FA is a polypropylene film with a film thickness of 30 μm, and the basis weight as the sheet thickness of the sheet is to be 170 g/m2.

In this case, as shown in FIG. 5, the processing pressure determined in step S106 is 2000 N, and the determined temporary processing temperature is 180° C.

Next, the controller 11 obtains the information regarding the image forming in the print job. Based on the information regarding the image forming, the temporary processing temperature determined in step S106 is corrected (step S107). For example, the controller 11 obtains from the storage 14 the sheet type of the sheet, the sheet thickness, the surface roughness, and the fixing temperature in the fixer 134 as the information regarding the image forming. For example, the controller 11 obtains the print rate from the received job information of the job as the information regarding the image forming.

FIG. 6 shows an example of the second table. For example, if the sheet according to the present embodiment is coated paper, as shown in FIG. 6, the correction value of the processing temperature based on the sheet type is −5° C.

As described above, when the sheet type is a type that does not conduct heat well, the correction value is set so that the processing temperature becomes a higher temperature. When the sheet type is a type with a rough surface roughness, similar to the above, the correction value is set so that the processing temperature becomes a higher temperature. When the sheet type is a type in which curling or wrinkling tends to occur, the correction value is set so that the processing temperature becomes a lower temperature.

FIG. 7 shows an example of a third table. For example, when a print rate in a printing job according to the present embodiment is 50%, as shown in FIG. 7, the correction value of the processing temperature based on the print rate is +10° C.

As described above, the higher the print rate is, the correction value is set so that the processing temperature becomes higher.

Therefore, the processing temperature is corrected to 185° C. by calculating from 180° C. that is the processing temperature temporarily determined in step S106, and adding −5° C. which is the correction value of the processing temperature based on the sheet type and +10° C. which is the correction value of the processing temperature based on the print rate.

The specific correction value based on the sheet thickness, surface roughness, and fixing temperature in the fixer 134 is omitted, but similar to the correction value based on the sheet type and the print rate, the correction value is obtained from a table set in advance.

Next, the controller 11 obtains the environment information from the second detector 180, and based on the environment information, the processing temperature corrected in step S107 is further corrected (step S108). The environment information obtained in step S108 is, for example, the temperature and the humidity in the image forming system 1 or around the image forming system 1.

The correction based on the environment information is performed when it is the environment outside a predetermined range from a standard environment (for example, the temperature being 20° C., and the humidity being 50%).

The specific correction value based on the temperature and the humidity is omitted, but the value can be obtained from a table set in advance as in the correction value based on the sheet type and the print rate, or the correction value can be obtained from calculation.

Next, the controller 11 determines whether the lamination using the film FA can be performed with the processing speed obtained in step S105, the processing pressure determined in step S106, and the processing temperature corrected in step S108 (step S109). The range of the processing conditions (processing pressure, processing temperature, and processing speed) with which the lamination can be performed is stored in advance in the storage 14 for each film type.

When it is possible to perform the lamination (step S109; YES), the controller 11 determines the processing speed obtained in step S105, the processing pressure determined in step S106, and the processing temperature corrected in step S108 as the processing condition to perform the lamination performing process (step S110). With this, the process ends.

The step S110 is the determination step in which the conditions of the lamination in the lamination step are determined.

When it is not possible to perform the lamination (step S109; NO), the controller 11 corrects the processing condition (step S111), and the process proceeds to step S109. To correct the processing conditions means, for example, to make the processing speed slower than the processing speed obtained in step S105 when the lamination performing process is performed with the processing conditions in which the fixing of the film F is insufficient.

When the lamination using the film FA can be performed using the processing conditions corrected in step S111, in step S110, the controller 11 determines that the corrected processing conditions are to be the processing conditions used to perform the lamination performing process.

Returning to FIG. 3, the controller 11 performs the processing condition determination process for the film FB (step S2). The flow of the processing condition determination process for the film FB is the same as the processing condition determination process of the film FA, and the explanation is omitted.

Next, the controller 11 determines whether the processing conditions are determined in step S1 and step S2 (step S3).

When the processing condition is not determined in step S1 and step S2 (step S3; NO), that is, the sheet cannot be thermally processed, the controller 11 ends the present process.

When the processing condition is determined in step S1 and step S2 (step S3; YES), the controller 11 obtains the film selection setting information from the storage 14 and selects the film F to be used in the lamination performing process (step S4).

For example, when it is set to select the film roll 261 with the film F with higher stability in the lamination, the controller 11 selects the film with higher stability from the film FA or film FB based on the processing conditions determined in step S1 and step S2. Here, higher stability is specifically defined as the ability to process at lower processing temperatures or that the processing temperature can be selected from a wide range. When the film F can be processed with a lower processing temperature, the processing temperature is more stable because less heat is taken away by the sheet. When the processing temperature can be selected from a wide range for the film F, the problems in the lamination hardly occur.

Next, the controller 11 sets the processing conditions determined in step S1 or step S2 for the film F selected in step S4 in the laminator 26 (step S5). Then, the controller 11 performs the lamination (step S6), and ends the process.

The step S6 is the lamination process.

According to the present embodiment, the film F is a rolled form, but the film F may be cut sheets of laminating film.

As described above, the image forming system 1 according to the present embodiment includes the image former 13 that forms the image on the recording medium (sheet), the laminator 26 that laminates the film F on the surface of the recording medium in which the image is formed by the image former 13, and the controller (controller 11) that obtains information regarding image forming by the image former 13, and that determines the conditions for the lamination by the laminator 26 based on the information regarding the obtained image forming.

Therefore, the conditions of the lamination can be easily set.

According to the image forming system 1 of the present embodiment, the image former 13 forms the image by an electrophotographic method.

Therefore, when the lamination is performed on the recording medium on which the image is formed by the electrophotographic method, the conditions of the lamination can be easily set.

According to the image forming system 1 of the present embodiment, the information regarding image forming includes the information regarding the fixing temperature condition in the image former 13.

Therefore, the conditions of the lamination can be easily set based on the fixing temperature condition as the sheet temperature condition of the sheet ejected from the image forming apparatus 10.

According to the image forming system 1 of the present embodiment, the information regarding the image forming includes information regarding at least one among the type of the recording medium, the thickness, the surface roughness and the print rate.

Therefore, the condition of the lamination can be easily set based on the type of storage medium, the thickness, the surface roughness and the print rate.

According to the image forming system 1 of the present embodiment, the laminator 26 melts the adhesive layer of the film F including the transparent resin film layer and the adhesive layer. The melted adhesive layer is adhered to the surface of the recording medium.

Therefore, the lamination can be performed with the lamination condition that is easily set.

According to the image forming system 1 of the present embodiment, any one among a plurality of different types of films F can be selected and mounted.

Therefore, the lamination can be performed using a more suitable film.

The image forming system 1 according to the present embodiment includes the mounter 25 in which the plurality of different types of films F are mounted and a selector (controller 11) that selects one of the plurality of films F mounted on the mounter 25. The laminator 26 performs the lamination using the film F selected by the selector.

Therefore, the more suitable film is automatically selected and the lamination can be performed using the more suitable film.

According to the image forming system 1 of the present embodiment, the film F is a rolled continuous film or a cut film cut in the predetermined size.

Therefore, the lamination conditions can be easily set whether a continuous film or a cut film is used.

According to the image forming system 1 of the present embodiment, the controller 11 obtains the information regarding the lamination and determines the lamination conditions based on the information regarding the image forming and the information regarding the lamination.

Therefore, the lamination conditions can be easily set based on the information regarding the image forming and the information regarding the lamination.

According to the image forming system 1 of the present embodiment, the information regarding the lamination includes the information regarding the type of film F or the processing speed.

Therefore, based on the information regarding the type of film F or the processing speed, the lamination conditions can be easily set.

According to the image forming system 1 of the present embodiment, the lamination conditions include at least any one of the following, processing temperature, processing pressure, and processing speed.

Therefore, the processing temperature, the processing pressure, and the processing speed which are lamination conditions can be easily set.

According to the image forming system 1 of the present embodiment, the controller 11 determines the processing pressure and the temporary processing temperature based on at least one of the type of the film F and the processing speed.

Therefore, the conditions of the lamination can be easily set based on the type of film F and the processing speed.

According to the image forming system 1 of the present embodiment, the controller 11 corrects the temporary processing temperature based on at least one among the type of the recording medium, thickness, surface roughness, and print rate as information regarding the image forming and environment information.

Therefore, the processing temperature that is more suitable can be determined based on the type of the recording medium, thickness, surface roughness, print rate and environment information.

According to the image forming system 1 of the present embodiment, the image forming apparatus 10 including the image former 13 is connected directly or indirectly to the post-processing apparatus 20 including the laminator 26.

Therefore, the lamination conditions can be easily set in the image forming system in which the image forming apparatus and the post-processing apparatus are directly or indirectly connected.

According to the image forming system 1 of the present embodiment, at least one among the image former 13, the laminator 26, and the controller 11 is a separate device and connected to be able to communicate with the other two devices.

Therefore, the lamination conditions can be easily set in the image forming system in which at least one among the image former 13, the laminator 26, and the controller 11 is the separate device and is connected to be able to communicate with the other two devices.

Although an embodiment of the present invention is described specifically above, the embodiments of the present invention are not limited to the above, and various modifications are possible without leaving the scope of the invention.

For example, according to the above embodiment, the lamination is performed on the surface of the recording medium, but the present invention is not limited to the above. The lamination is not limited to laminating one entire surface of the recording medium, and the lamination may be performed on a portion of a surface or on both surfaces instead of just one surface.

According to the present embodiment, the sheet is a cut sheet, but the sheet may be a continuous sheet.

According to the present embodiment, the post processing apparatus 20 is an optional configuration attached separately from the image forming apparatus 10, but the configuration is not limited to the above. For example, the post-processing apparatus 20 may be included in the image forming apparatus 10.

The lamination performing process and the processing condition determination process according to the present embodiment is performed by the controller 11, but the present invention is not limited to the above. The controller 21 of the post-processing apparatus 20 may perform the process. Alternatively, the controller of the external device connected to the image forming apparatus 10 or the post-processing apparatus 20 may perform the process.

According to the present embodiment, the image former 13 forms the electrophotographic image but the image may be formed by an inkjet method.

According to the present embodiment, the type of sheet (sheet type), the thickness (sheet thickness), and the surface roughness which are the information regarding the image forming are detected by the first detector 17, and the controller 11 obtains the detected results. However, the present embodiment is not limited to the above. The controller 11 obtains the sheet type, thickness, and surface roughness which are the information regarding the image forming set in advance in the print job. The controller 11 may obtain the sheet type, the thickness, and the surface roughness which are information regarding the image forming by input by the user through the operator 152.

According to the present embodiment, the information regarding the fixing temperature in the fixer 134 is used in the processing condition determination process as the information regarding the sheet temperature conditions ejected from the image forming apparatus 10, but the present invention is not limited to the above. The image forming system 1 may include a detector that detects the sheet temperature discharged from the image forming apparatus 10 and the detected result of the detector may be used as the information regarding the sheet temperature condition discharged from the image forming apparatus 10.

The detailed configuration and the detailed operation of the devices included in the image forming apparatus can be suitably changed without leaving the scope of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming system comprising:
   an image forming apparatus that forms an image on a recording medium based on information regarding image forming;
   a laminator that performs lamination in which a film is laminated on a surface of the recording medium on which the image is formed by the image forming apparatus; and
   a hardware processor that obtains the information regarding image forming from the image forming apparatus and that determines a condition of the lamination by the laminator based on the obtained information regarding the image forming.

2. The image forming system according to claim 1, wherein the image forming apparatus forms an image by an electrophotographic method.

3. The image forming system according to claim 2, wherein the information regarding the image forming includes information regarding a fixing temperature condition in the image forming apparatus.

4. The image forming system according to claim 1, wherein the information regarding the image forming includes information regarding at least one among a type of the recording medium, thickness, surface roughness, and print rate.

5. The image forming system according to claim 1, wherein the laminator melts an adhesive layer of the film including a transparent resin film layer and the adhesive layer, and adheres the melted adhesive layer to the surface of the recording medium.

6. The image forming system according to claim 1, wherein any one of a plurality of different types of films can be selected and mounted.

7. The image forming system according to claim 1, further comprising a mounter which is configured to be capable of allowing a plurality of different types of films to be mounted,
   wherein the hardware processor selects any one among the plurality of films mounted on the mounter, and
   wherein the laminator performs lamination using the film selected by the hardware processor.

8. The image forming system according to claim 1, wherein the film is a rolled continuous film or a cut film cut in a predetermined size.

9. The image forming system according to claim 1, wherein the hardware processor obtains information regarding the lamination and determines the condition of the lamination based on the information regarding the image forming and information regarding the lamination.

10. The image forming system according to claim 9, wherein the information regarding the lamination includes information regarding a type of the film and processing speed.

11. The image forming system according to claim 1, wherein the condition of the lamination includes at least one among processing temperature, processing pressure, and processing speed.

12. The image forming system according to claim 1, wherein the hardware processor determines processing pressure and temporary processing temperature based on at least one among a type of the film and processing speed.

13. The image forming system according to claim 12, wherein the hardware processor corrects the temporary processing temperature based on at least one among a type of the recording medium, thickness, surface roughness, and print rate as information regarding the image forming and environment information.

14. The image forming system according to claim 1, wherein the image forming apparatus is directly or indirectly connected to the laminator.

15. The image forming system according to claim 1, wherein at least one among the image forming apparatus, the laminator, and the hardware processor is separate and is connected to the other two in a communicable state.

16. A non-transitory computer-readable storage medium storing a program causing a computer in an image forming system to perform:

laminating in which a film is laminated on a surface of a recording medium on which an image is formed by an image forming apparatus;

first obtaining in which information regarding image forming is obtained from the imaging forming apparatus; and determining a condition of the lamination performed in the laminating based on the information regarding the image forming obtained in the first obtaining.

17. The storage medium including the program according to claim 16, wherein the information regarding the image forming includes information regarding at least one among a type of the recording medium, thickness, surface roughness, and print rate.

18. The storage medium including the program according to claim 16, further comprising second obtaining in which information regarding the lamination is obtained,
wherein in the determining, the condition of the lamination is determined based on the information regarding the image forming and information regarding the lamination obtained in the second obtaining.

19. The storage medium including the program according to claim 18, wherein the information regarding lamination includes information regarding a type of the film and processing speed.

20. The storage medium according to claim 16, wherein the condition of the lamination includes at least one among processing temperature, processing pressure, and processing speed.

* * * * *